Patented Feb. 12, 1946

2,394,756

UNITED STATES PATENT OFFICE 2,394,756

PRODUCTION OF SYNTHETIC RUBBERS

Robert R. Dreisbach, Midland, Mich., assignor to The Dow Chemical Company, Midland, Mich., a corporation of Michigan No Drawing. Application November 29, 1941, Serial No. 421,024

8 Claims. (Cl. 260—66)

This invention concerns an improved method for the production of synthetic rubber-like products by the copolymerization of a conjugated diolefine and an unsaturated ketone together, if desired, with other polymerizable organic compounds. It particularly concerns such method whereby one or more of the physical properties of the cured product, particularly the elongation which it will withstand without breaking, may be improved.

The unsaturated ketones which are employed as reactants in the process have the general formula:

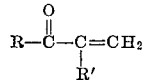

wherein R represents an alkyl group and R' represents hydrogen or an alkyl group. For convenience these unsaturated ketones, which are either vinyl ketones or substituted-vinyl ketones, are hereinafter referred to as "vinyl-type ketones."

United States Patent No. 1,901,354 discloses the production of rubber-like products by polymerizing a conjugated diolefine, e. g. butadiene, together with a minor amount of an unsaturated ketone, e. g. methyl vinyl ketone. In my copending application Serial No. 344,958, filed July 11, 1940, I have disclosed that a mixture of a diolefine and a vinyl-type ketone containing from 55 to 70 per cent of the latter may be polymerized more readily and completely to obtain products which, when compounded and vulcanized, are stronger and tougher than are obtainable under otherwise similar conditions from the same reactants in other proportions. In another copending application Serial No. 376,996, filed February 1, 1941, I have disclosed that a mixture of a conjugated diolefine, a vinyl-type ketone, and a vinyl type nitrile, may be polymerized to obtain rubber-like products which are exceptionally resistant to swelling by hydrocarbon and halo-hydrocarbon solvents. The present application is a continuation-in-part of said copending applications Serial Nos. 344,958 and 376,996.

I have now discovered that certain of the mechanical properties, particularly the softness and ultimate elongation properties, of the rubber-like copolymers made by polymerizing a mixture of unsaturated organic compounds, comprising a diolefine and a vinyl-type ketone as the principal ingredients, may be improved by carrying the polymerization out in the presence of an agent which is effective in inhibiting the polymerization of vinyl-type ketones at room temperature. A number of agents such as hydroquinone, aldol-alpha-naphthyl-amine, phenyl - beta - naphthyl-amine, sym-di-beta-naphthyl-para-phenylenediamine, ditolylamine, etc., which are known as inhibitors against the polymerization of other polymerizable compounds, e. g. styrene or methylmethyacrylate, etc., and at least one of which has heretofore been known as a polymerization inhibitor for vinyl-type ketones, are satisfactory. However, many of the known polymerization inhibitors for styrene and other polymerizable organic compounds are not sufficiently effective in retarding the polymerization of vinyl-type ketones to be satisfactory for use as the inhibiting agent in the present process. To be satisfactory, the inhibitor should be one which when added to methyl isopropenyl ketone in amount corresponding to 0.2 per cent by weight of the latter, will preserve the ketone as a thin mobile liquid for at least one month at room temperature under exposure to ordinary diffused daylight.

The inhibitor, or mixture of inhibitors, is used in amount sufficient to inhibit polymerization, particularly of the ketone reactant, at room temperature, but insufficient to provent ready copolymerization to form the rubber-like product at usual polymerizing temperatures. The proportion required varies somewhat depending on the particular inhibitor used, but is in all instances small, e. g. less than 0.5 per cent of the combined weight of the polymerizable compounds. When using hydroquinone as the inhibitor, the proportion thereof should not exceed 0.05 per cent, and is preferably between 0.005 and 0.03 per cent, of the weight of the polymerizable compounds. The other inhibitors hereinbefore mentioned are less effective than hydroquinone in preventing the polymerization of vinyl-type ketones and are employed usually in somewhat larger proportion, e. g. in amount corresponding to between 0.05 and 0.5, preferably between 0.08 and 0.2, per cent of the combined weight of the polymerizable compounds. Although the inhibitor and the polymerizable compounds may be admixed in any order desired, the inhibitor may advantageously be added to the ketone reactant shortly after preparation of the latter so as to stabilize the ketone against polymerization during storage or handling. The stabilized ketone may thereafter be admixed with the other compounds with which it is to be copolymerized, in which case the stabilizing agent for the ketone serves as the inhibiting agent which is to be present during the copolymerization.

Examples of vinyl-type ketones which may be used in preparing the rubber-like products are methyl vinyl ketone, methyl isopropenyl ketone, ethyl vinyl ketone, isopropenyl vinyl ketone, ethyl isopropenyl ketone, isopropenyl ketone, etc. The ketone is preferably employed in amount corresponding to between 40 and 65 per cent by weight of all polymerizable compounds present, but it may be used in smaller or larger proportions.

Examples of conjugated diolefines suitable for use in the process are butadiene-1.3, isoprene, 2-ethyl butadiene-1.3, 2.3-dimethyl butadiene-1.3, etc. The diolefine may be used in proportions corresponding to between 30 and 95 per cent of the combined weight of all polymerizable compounds present, but as hereinbefore indicated, products of greatest strength and toughness are obtained when the mixture of polymerizable compounds contains between 30 and 45 per cent by weight of the diolefine, the remainder being the vinyl-type ketone either alone or together with a minor amount of one or more other polymerizable compounds.

Other polymerizable organic compounds which may be employed in minor proportion as reactants are vinyl cyanide, methyl methacrylate, methyl acrylate, ethyl acrylate, styrene, parachloro-styrene, orthoethyl-styrene, etc. The proportion of such polymerizable compounds other than the diolefine and the vinyl-type ketone is less than 30 per cent and usually less than 20 per cent of the combined weight of the polymerizable compounds in the mixture.

The polymerization is preferably carried out in aqueous emulsion, but it may be effected in other usual ways, e. g. by mere warming of a mixture of the polymerizable compounds to a reaction temperature. In practice the polymerizable compounds in the proportions hereinbefore mentioned are mixed with an aqueous solution of an emulsifying agent and the mixture is agitated to effect emulsification. A number of emulsifying agents, such as egg albumen, soaps, sulphonic acids of aliphatic and alkyl aromatic hydrocarbons of high molecular weight, sodium or potassium salts of such sulphonic acids, etc., which may be employed in preparing such emulsions are well known. The emulsifying agent is, of course, used in the proportion required to form a stable emulsion. Only a small proportion, e. g. from 1 to 3.5 per cent by weight of a sulphonate based on the water present, is usually required. If desired, a small proportion of a polymerization accelerator, such as hydrogen peroxide, benzoyl peroxide, sodium persulphate, potassium persulphate, sodium perborate, and a polymerization director such as a polychlorinated hydrocarbon, such as hexachloroethane, pentachloroethane, or hexachlorobenzene, etc., may be added to promote rapid polymerization. An alkali metal persulphate is particularly effective as a polymerization promoter and is preferably used together with one of the polymerization directors just mentioned.

The emulsion is warmed in a closed container to a temperature between about 30° and 100° C., preferably between 50° and 70° C., to effect the polymerization. The reaction is usually substantially complete after from 10 hours to 3 days of heating.

The product may be recovered from the emulsion in any of the usual ways, e. g. by coagulation or by evaporation of the water. It usually resembles uncured rubber. It may be compounded with usual rubber compounding agents, e. g. carbon black, fillers, antioxidants, accelerators, vulcanizing agents, etc., and cured to obtain a synthetic rubber of good quality.

The product thus obtained is capable of greater elongation and is usually softer and stronger than a corresponding product prepared similarly except for omitting the inhibitor during the polymerization. The effectiveness of the inhibitor in improving the properties of the product becomes more pronounced as the size of the polymerization mixture is increased, apparently due to the inhibitor reducing the tendency toward spontaneous overheating within the mixture. Thus, when the emulsion of the starting materials amounts to a 50 pound batch or more, all three of the above properties of the product are usually improved by polymerizing the starting materials in the presence of the inhibitor.

The following examples describe a number of ways in which the principle of the invention has been applied and illustrate certain of its advantages, but the examples are not to be construed as limiting the invention.

EXAMPLE 1

In each of two experiments, 16 parts by weight of butadiene-1.3, 24 parts of methyl isopropenyl ketone, and 0.4 part of hexachloroethane were added to 50 parts of an aqueous solution of Turkey red oil, i. e. sulphonated castor oil, and Dreft, i. e. a mixture of sodium sulphate and sodium salts of higher mono-alkyl sulphates in concentrations of 3.5 per cent by weight and 1 per cent, respectively. Hydroquinone, in amount corresponding to 0.006 per cent of the combined weight of the polymerizable compounds, was added to one of the mixtures, but not to the other. Each mixture was agitated in a closed container with exclusion of light to effect emulsification. The emulsion was heated with agitation in the container at a temperature of 60° C. for 88 hours. The container was then opened and water was evaporated from the emulsion at about 70° C. The residual rubbery material was heated to 100° C. under vacuum, i. e. at a final pressure of about 20 millimeters, to vaporize moisture and unreacted material therefrom. The product was compounded on cooled rolls with 50 per cent of its weight of carbon black, 10 per cent of zinc oxide, 3 per cent of sulphur, 2 per cent of pine tar, 2 per cent of rosin, and 0.1 per cent of mercapto-thiazole, rolled into a sheet, and cured by heating under pressure to 148° C. for 20 minutes. Standard test strips were cut from the sheet and were used in determining the tensile strength, the per cent ultimate elongation and the Shore Durometer hardness of the product. The procedure followed in determining the tensile strength and per cent elongation characteristics is given in A. S. T. M. D–412–39T. The following table indicates whether or not hydroquinone was used in each experiment and gives the tensile strength, per cent ultimate elongation and the Shore Durometer hardness of the compounded and cured product.

*Table I*

| Run No. | Hydroquinone used | Properties of product | | |
|---|---|---|---|---|
| | | Tensile strength, lbs./sq. in. | Per cent elongation | Hardness |
| 1 | No | 2,770 | 430 | 72 |
| 2 | Yes | 2,870 | 480 | 70 |

EXAMPLE 2

In each of three experiments, an aqueous emulsion was prepared by mixing 16 parts by weight of butadiene-1.3 and 24 parts of methyl isopropenyl ketone with 7.5 parts of an aqueous solution of aliphatic ester sulphate (i. e. oil ester sulphate) in 3 per cent by weight concentration and 42.5 parts of an aqueous solution which contained 1 per cent by weight of Aquarex D (i. e. monosodium sulphate esters of a mixture of higher alcohols consisting principally of lauryl and myristic alcohols), 1 per cent of Santomerse No. 3 (i. e. an alkali metal salt of dodecyl benzene sulphonate), 0.5 per cent of sodium carbonate, and 0.15 per cent of potassium persulphate. Two of the emulsions were treated with the polymerization inhibitor, sym-di-(beta-naphthyl-)paraphenylenediamine, in respective amounts corresponding to 0.05 and 0.15 per cent of the combined weight of the polymerizable compounds present. Each emulsion was heated with agitation in a closed container at 60° C. for 20 hours after which the resultant copolymer product was separated, devolatilized, and cured and the properties of the cured product were determined as in Example 1. In each of the experiments the yield of devolatilized product was 94 per cent of theoretical or higher, based on the weight of the polymerizable starting materials. Table II gives the proportion of the inhibitor used in each experiment, expressed as per cent of the combined weight of the polymerizable compounds. It also gives the tensile strength in pounds per square inch of cross section, the per cent ultimate elongation and the Shore Durometer hardness of the compounded and cured product.

Table II

| Run No. | Per cent inhibitor | Properties of product | | |
|---|---|---|---|---|
| | | Tensile strength, lbs./sq. in. | Per cent elongation | Hardness |
| 1 | None | 2,310 | 280 | 75 |
| 2 | 0.05 | 2,740 | 380 | 70 |
| 3 | 0.15 | 2,940 | 400 | 74 |

EXAMPLE 3

In each of a series of experiments, an aqueous emulsion was prepared by mixing 16 parts by weight of butadiene-1.3, 18 parts of methyl isopropenyl ketone and 6 parts of vinyl cyanide with 50 parts of an aqueous solution which contained Aquarex D (i. e. the monosodium sulphate ester of a mixture of higher alcohols consisting principally of lauryl and myristic alcohols) in 1 per cent by weight concentration, Santomerse No. 3 (i. e. an alkali metal salt of dodecyl benzene sulphonate) in 1 per cent concentration, sodium bicarbonate in 0.5 per cent concentration and potassium persulphate in 0.15 per cent concentration. To certain of the emulsions, hydroquinone was added in the amount indicated in the following Table III. Each emulsion was heated with agitation in a closed container at 60° C. for 16–18 hours, after which the resultant copolymer product was separated, devolatilized, compounded, cured, and the properties of the cured product were determined as in Example 1. Table III gives the proportion of hydroquinone used in each experiment, expressed as per cent of the combined weight of the polymerizable compounds. It also gives the per cent yield of the devolatilized copolymer product, based on the combined weight of the polymerizable compounds in the initial mixture, and the tensile strength in pounds per square inch cross section, the per cent ultimate elongation, and the Shore Durometer hardness of the compounded and cured product.

Table III

| Run No. | Per cent hydroquinone | Yield of copolymer, per cent | Properties of cured product | | |
|---|---|---|---|---|---|
| | | | Tensile strength, lbs./sq. in. | Per cent elongation | Hardness |
| 1 | None | 92 | 2,420 | 260 | 86 |
| 2 | 0.002 | 93 | 2,530 | 330 | 80 |
| 3 | 0.006 | 94 | 2,730 | 400 | 78 |
| 4 | 0.009 | 82 | 2,895 | 440 | 75 |

EXAMPLE 4

In each of two experiments a mixture of 45 per cent by weight of butadiene-1.3, 50 per cent of methyl isopropenyl ketone and 5 per cent of styrene was emulsified with water as in Example 3. Hydroquinone in amount corresponding to 0.006 per cent of the combined weight of the polymerizable compounds was added to one of the emulsions, but not to the other. Each emulsion was heated with agitation at 60° C. in a closed container for about 20 hours, after which the rubber-like copolymer product was separated, devolatilized, compounded, cured, and the physical properties were determined as in Example 1. Table IV gives the amount of hydroquinone used in each experiment as per cent of the combined weight of the polymerizable compounds, and the tensile strength, per cent elongation and Shore Durometer hardness of the compounded and cured product. In each experiment the devolatilized copolymer product was obtained in practically quantitative yield.

Table IV

| Run No. | Per cent hydroquinone | Properties of cured product | | |
|---|---|---|---|---|
| | | Tensile strength, lbs./sq. in. | Per cent elongation | Hardness |
| 1 | None | 2,290 | 340 | 86 |
| 2 | 0.006 | 2,790 | 350 | 78 |

Improvements in the quality of the product similar to those illustrated in the foregoing detailed examples have been obtained by using hydroquinone and other of the polymerization inhibitors hereinbefore mentioned in experiments wherein the proportions of the polymerizable compounds, e. g. the diolefine and the vinyl-type ketone were varied widely and also in experiments wherein actinic light instead of a peroxide was used as a polymerization accelerator.

Other modes of applying the principle of the invention may be employed instead of those explained, change being made as regards the method herein disclosed, provided the step or steps stated by any of the following claims or the equivalent of such step or steps be employed.

I therefore particularly point out and distinctly claim as my invention:

1. In a method wherein a mixture of polymerizable organic compounds, comprising butadiene and methyl isopropenyl ketone as the principal ingredients, is polymerized in aqueous emulsion to form a rubber-like product, the improvement which consists in carrying out the polymerization in the presence of an agent which is effective in inhibiting the polymerization of the methyl isopropenyl ketone at room temperature, said agent being employed in an amount sufficient to inhibit polymerization of the methlyl isopropenyl ketone at room temperature but insufficient to prevent the copolymerization reaction, which amount corresponds to between 0.005 and 0.5 per cent of the combined weight of the polymerizable compounds.

2. In a method wherein a mixture of polymerizable organic compounds, comprising butadiene an methyl ispropenyl ketone as the principal ingredients, is polymerized while in aqueous emulsion to form a rubber-like product, the step which consists in carrying out the polymerization in the presence of hydroquinone in amount corresponding to between 0.005 and 0.05 per cent of the combined weight of the polymerizable compounds.

3. In a method wherein a mixture of polymerizable organic compounds, which contain between 30 and 45 per cent by weight of butadiene and between 30 and 70 percent of methyl isopropenyl ketone, is polymerized while in aqueous emulsion to form a rubber-like product, the step which consists in carrying out the polymerization in the presence of hydroquinone in amount corresponding to between 0.005 and 0.03 per cent of the combined weight of polymerizable compounds.

4. In a method wherein a mixture of polymerizable organic compounds, which consists of between 30 and 45 per cent by weight of butadiene, between 30 and 45 per cent by weight of methyl isopropenyl ketone, and the remainder being vinyl cyanide, is polymerized while in aqueous emulsion to form a rubber-like product, the step which consists in carrying out the polymerization in the presence of an inhibitor against the polymerization of the methyl isopropenyl ketone, said inhibitor being employed in an amount sufficient to inhibit polymerization of the methyl isopropenyl ketone at room temperature but insufficient to prevent the copolymerization reaction, which amount corresponds to between 0.005 and 0.5 per cent of the combined weight of the polymerizable compounds.

5. In a method wherein a mixture of polymerizable organic compounds, which consists of between 30 and 45 per cent by weight of butadiene, between 30 and 45 per cent by weight of methyl isopropenyl ketone, and the remainder being vinyl cyanide, is polymerized while in aqueous emulsion to form a rubber-like product, the step which consists in carrying out the polymerization in the presence of hydroquinone in amount corresponding to between 0.005 and 0.03 per cent of the combined weight of the polymerizable compounds.

6. In a method wherein a mixture of polymerizable organic compounds comprising, as the principal ingredients, an aliphatic conjugated diolefine and methyl isopropenyl ketone is polymerized to form a rubber-like product, the improvement which consists in carrying out the polymerization in the presence of an agent which is effective in inhibiting polymerization of the unsaturated ketone at room temperature, said agent being employed in an amount sufficient to inhibit polymerization of the unsaturated ketone at room temperature but insufficient to prevent the copolymerization, which amount corresponds to between 0.005 and 0.5 per cent of the combined weight of the polymerizable compounds.

7. In a method wherein a mixture of polymerizable organic compounds comprising, as the principal ingredients, an aliphatic conjugated diolefine and methyl isopropenyl ketone is polymerized while in aqueous emulsion to form a rubber-like product, the step of carrying out the copolymerization reaction in the presence of an agent which is effective in inhibiting the polymerization of the unsaturated ketone at room temperature, said agent being present in an amount sufficient to inhibit polymerization of the unsaturated ketone at room temperature but insufficient to prevent the copolymerization, which amount corresponds to between 0.005 and 0.5 per cent of the combined weight of the polymerizable compounds.

8. In a method wherein a mixture of polymerizable organic compounds comprising, as the principal ingredients, an aliphatic conjugated diolefine and methyl isopropenyl ketone is polymerized while in aqueous emulsion to form a rubber-like product, the improvement which consists in carrying out the polymerization in the presence of hydroquinone in amount corresponding to between 0.005 and 0.05 per cent of the combined weight of the polymerizable compounds.

ROBERT R. DREISBACH.